United States Patent
Therrien et al.

(10) Patent No.: US 10,303,656 B2
(45) Date of Patent: May 28, 2019

(54) PARALLELIZING AND DEDUPLICATING BACKUP DATA

(71) Applicants: David G. Therrien, Nashua, NH (US); Stephen M. Stickles, Boylston, MA (US); Thomas J. Gillispie, Acton, MA (US); William Andrews, Reading, MA (US)

(72) Inventors: David G. Therrien, Nashua, NH (US); Stephen M. Stickles, Boylston, MA (US); Thomas J. Gillispie, Acton, MA (US); William Andrews, Reading, MA (US)

(73) Assignee: Exagrid Systems, Inc., Marlborough, MA (US)

( * ) Notice: Subject to any disclaimer, the term of this patent is extended or adjusted under 35 U.S.C. 154(b) by 587 days.

(21) Appl. No.: 14/825,322

(22) Filed: Aug. 13, 2015

(65) Prior Publication Data

US 2017/0046360 A1 Feb. 16, 2017

(51) Int. Cl.
*G06F 16/00* (2019.01)
*G06F 16/174* (2019.01)
(Continued)

(52) U.S. Cl.
CPC ...... *G06F 16/1748* (2019.01); *G06F 11/1453* (2013.01); *G06F 11/1464* (2013.01);
(Continued)

(58) Field of Classification Search
CPC ..................... G06F 17/30156; G06F 16/1748
(Continued)

(56) References Cited

U.S. PATENT DOCUMENTS

| 5,574,906 A | 11/1996 | Morris |
|---|---|---|
| 5,813,017 A | 9/1998 | Morris |

(Continued)

FOREIGN PATENT DOCUMENTS

| EP | 0 774 720 A2 | 5/1997 |
|---|---|---|
| EP | 0 774 720 A3 | 5/1997 |

(Continued)

OTHER PUBLICATIONS

"Extreme Binning: Scalable, Parallel Deduplication for Chunk-Based File Backup", By: Deepavali Bhagwat, Published Dec. 2009; http://ieeexplore.ieee.org/stamp/stamp.jsp?tp=&arnumber=5366623.*

(Continued)

*Primary Examiner* — Chelcie L Daye
(74) *Attorney, Agent, or Firm* — Mintz Levin Cohn Ferris Glovsky and Popeo, P.C.

(57) ABSTRACT

A method, a system, and a computer program product for performing a backup of data are disclosed. A grid server in a plurality of grid servers is selected for deduplicating a segment of data in a plurality of segments of data contained within a data stream. The segment of data is forwarded to the selected grid server for deduplication. A zone contained within the forwarded segment of data is deduplicated using the selected server. The deduplication is performed based on a listing of a plurality of zone stamps. Each zone stamp in the plurality of zone stamps represents a zone in a plurality of zones deduplicated by at least one server in the plurality of grid servers.

27 Claims, 10 Drawing Sheets

(51) Int. Cl.
*G06F 17/30* (2006.01)
*G06F 16/2455* (2019.01)
*G06F 11/14* (2006.01)

(52) U.S. Cl.
CPC .. *G06F 16/24568* (2019.01); *G06F 17/30156* (2013.01); *G06F 17/30159* (2013.01); *G06F 17/30516* (2013.01)

(58) Field of Classification Search
USPC .......................................................... 707/692
See application file for complete search history.

(56) References Cited

U.S. PATENT DOCUMENTS

| | | | |
|---|---|---|---|
| 7,539,745 B1 | 5/2009 | Wang et al. | |
| 7,562,186 B2 | 7/2009 | Li et al. | |
| 7,769,722 B1 | 8/2010 | Bergant et al. | |
| 7,962,520 B2 | 6/2011 | Patterson et al. | |
| 8,285,957 B1 | 10/2012 | Nag et al. | |
| 8,315,985 B1 | 11/2012 | Ohr et al. | |
| 8,412,848 B2 | 4/2013 | Therrien et al. | |
| 8,447,740 B1 | 5/2013 | Huang et al. | |
| 8,812,738 B2 * | 8/2014 | Therrien ............. | H03M 7/3084 709/247 |
| 8,898,120 B1 * | 11/2014 | Efstathopoulos ... | G06F 17/3007 707/692 |
| 8,972,672 B1 | 3/2015 | Wallace et al. | |
| 9,110,898 B1 | 8/2015 | Chamness et al. | |
| 9,286,313 B1 | 3/2016 | Sharangpani | |
| 9,384,205 B1 | 7/2016 | Gipp et al. | |
| 9,477,661 B1 | 10/2016 | Chamness et al. | |
| 2002/0073106 A1 | 6/2002 | Parker et al. | |
| 2007/0239945 A1 | 10/2007 | Li et al. | |
| 2008/0195677 A1 | 8/2008 | Sudhakar et al. | |
| 2009/0182789 A1 * | 7/2009 | Sandorfi ............. | G06F 11/1004 707/999.2 |
| 2010/0306412 A1 | 12/2010 | Therrien et al. | |
| 2011/0119240 A1 | 5/2011 | Shapira | |
| 2011/0273982 A1 | 11/2011 | Akirav et al. | |
| 2012/0137173 A1 | 5/2012 | Burshan et al. | |
| 2012/0150798 A1 | 6/2012 | Dawson et al. | |
| 2012/0303680 A1 | 11/2012 | McLennan et al. | |
| 2013/0024435 A1 | 1/2013 | Poirier et al. | |
| 2013/0066868 A1 | 3/2013 | Hecker et al. | |
| 2014/0052700 A1 | 2/2014 | VanderSpek et al. | |
| 2014/0089260 A1 | 3/2014 | Amrhein et al. | |
| 2014/0143219 A1 | 5/2014 | Therrien et al. | |
| 2014/0258655 A1 | 9/2014 | Park et al. | |
| 2014/0279956 A1 | 9/2014 | Trimble et al. | |
| 2015/0326481 A1 | 11/2015 | Rector | |
| 2016/0253351 A1 | 9/2016 | Hansen et al. | |
| 2016/0342618 A1 | 11/2016 | Watkins et al. | |
| 2017/0060696 A1 | 3/2017 | Wellnitz et al. | |

FOREIGN PATENT DOCUMENTS

| | | |
|---|---|---|
| EP | 0 774 720 B1 | 5/1997 |
| EP | 2 698 732 A1 | 2/2014 |
| EP | 3 062 227 A1 | 8/2016 |
| EP | 3 098 714 A1 | 11/2016 |
| WO | WO-01/52116 A1 | 7/2001 |
| WO | WO-01/52116 A8 | 7/2001 |

OTHER PUBLICATIONS

1997 Research Paper, *Efficient Distributed Backup with Delta Compression* (Randal C. Burns, Darrell D.E. Long), 11 pages.
2000 Research Paper, *File System Support for Delta Compression* (Joshua P. MacDonald), 32 pages.
2002 Research Paper, *Cluster-based Delta Compression of a Collection of Files* (Zan Ouyang, Nasir Memon, Torsten Suel, Dimitre Trendafilov), 10 pages.
Extended European Search Report dated Nov. 22, 2013, for EP Application No. 13180747.1, filed Aug. 16, 2013, 5 pages.
Extended European Search Report dated Aug. 2, 2016, for EP Application No. 16157662.4, filed Feb. 26, 2016, 7 pages.
Extended European Search Report dated Mar. 23, 2017, for EP Application No. EP16184063.2, filed on Aug. 12, 2016, 8 pages.
Anonymous (May 2, 2012). "Throttling process (computing)—Wikipedia," located at <https://en.wikipedia.org/wiki/Throttling_process_(computing)>, last visited Apr. 11, 2018, 1 page.
Extended European Search Report dated Feb. 23, 2017 for EP Patent Application No. 16184062.4, 7 pages.
Microsoft, "Edit Replication Schedules and Bandwidth," (Oct. 2013), located at <https://docs.microsoft.com/en-us/previous-versions/windows/it-pro/windows-server-2008-R2-and-2008/cc732278(v=ws.11)> last visited Feb. 20, 2018, 2 pages.

* cited by examiner

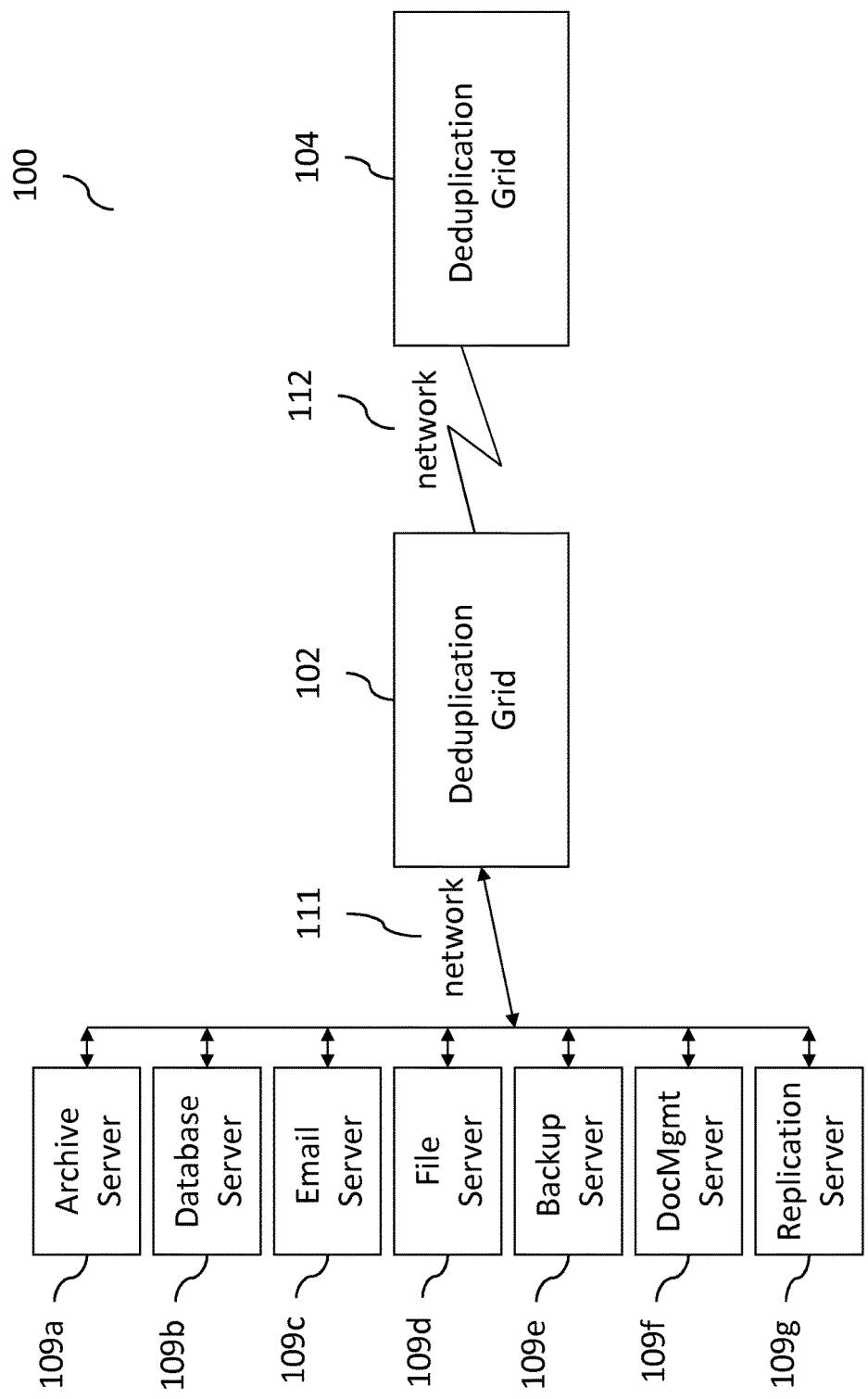

PARALLELIZING AND DEDUPLICATING BACKUP DATA

TECHNICAL FIELD

In some implementations, the current subject matter relates to data processing, and in particular, to parallelizing and deduplicating backup data.

BACKGROUND

Many information technology ("IT") operations and activities can be scheduled to run one or more times within some periodic cycle (daily, weekly, monthly, quarterly, etc.). One such application can be data backup. Data backups can be essential to preserving and recovery of data in the event of data loss, for example. To avoid interfering with daily user activities, data backups can be performed during periods of low application server utilization, typically, on weeknights and on weekends. The backup job workload can be the same or different depending on how much data needs to be protected and when. In some applications, backup jobs can be scheduled and/or configured using a commercial backup application, an operating system shell scripting, and/or in any other manner.

Backup applications employ a plurality of techniques to manage data designated for backup. One such technique includes deduplication. Deduplication can be used to eliminate redundancy in data stream created during the execution of periodically executed backup tasks. In some cases, deduplication can reduce data storage capacity consumption as well as an inter-site network bandwidth. It can do so by identifying and eliminating similar and/or identical sequences of bytes in a data stream. Deduplication can also include computation of cryptographic and/or simple hashes and/or checksums, as well as one or more forms of data compression (e.g., file compression, rich media data compression, delta compression, etc.).

Deduplication involves identifying similar or identical patterns of bytes within a data stream, and replacing those bytes with fewer representative bytes. By doing so, deduplicated data consumes less disk storage capacity than data that has not been deduplicated and when the data stream must be transmitted between two geographically separate locations, consumes less network bandwidth. Adaptive deduplication strategies combine inter-file and/or intra-file discovery techniques to achieve the aforementioned goals.

Deduplication can be used to reduce the amount of primary storage capacity that is consumed by email systems, databases and files within file systems. It can also be used to reduce the amount of secondary storage capacity consumed by backup, archiving, hierarchical storage management ("HSM"), document management, records management and continuous data protection applications. In addition, it can be used to support disaster recovery systems which provide secondary storage at two or more geographically dispersed facilities to protect from the total loss of data when one site becomes unavailable due to a site disaster or local system failure. In such a case, deduplication helps to reduce not only the amount of data storage consumed, but also the amount of network bandwidth required to transmit data between two or more facilities.

Conventional deduplication-based data storage systems perform site-wide deduplication by using a single compute server that is responsible for deduplicating all data stored on one or more simple disk storage units that have no deduplication processing capability. However, these deduplication systems typically suffer from availability issues, where failure/loss of a single compute server can render all data stored on the simple disk units inaccessible to the users and/or other systems. As the amount of backup data increases, additional disk storage units are added, but since they cannot assist in deduplication processing, the end-to-end backup time of these systems increases to the point where it exceeds the backup window limits of the IT department's service level agreement.

Further, using conventional magnetic disk and/or magnetic tape and tape drive solutions that do not support deduplication, either within/among each medium/drive combination, each full backup of large backup images can consume as much capacity as the size of the large backup image. This can become time-consuming and expensive to store weeks, months and/or years of retention backup data. Moreover, with traditional deduplication appliances that have a single deduplication engine that acts as a front-end compute node for multiple simple disk storage units, even if a very large backup image was to be sent to the deduplication appliance, the front-end compute node may have no way to process the data in parallel since it contains a single deduplication engine. Additionally, if that deduplication appliance fails during the backup process, the backup operation can remain in a failure state until that appliance is repaired/replaced, thereby making this single compute node architecture inefficient.

Thus, there is a need for a deduplication system that can manage data backup activities of incoming backup data streams, and maintain a constant backup window as the amount of data to be backed up increases over time. Moreover, there is a need for a deduplication system that can minimize storage capacity consumption within a deduplication system's grid servers, reduce bandwidth (e.g., wide-area network ("WAN") bandwidth), improve backup job completion rates, enable backup capacity that is larger than a single grid server can process, enable faster backup job completion, perform automatic load-balancing, etc.

SUMMARY

In some implementations, the current subject matter relates to a computer implemented method for performing a backup of data. The method can include selecting a grid server in a plurality of grid servers for deduplicating a segment of data in a plurality of segments of data contained within a data stream, forwarding the segment of data to the selected grid server for deduplication, and deduplicating, using the selected grid server, a zone contained within the forwarded segment of data based on a listing of a plurality of zone stamps, each zone stamp in the plurality of zone stamps representing a zone in a plurality of zones deduplicated by at least one server in the plurality of grid servers.

In some implementations, the current subject matter can include one or more of the following optional features. The listing of the plurality of zone stamps can be a listing specific to the selected grid server. The deduplicating can include comparing, using at least one zone contained in the listing specific to the selected server, the zone contained within the forwarded segment of data to at least one zone stored on the selected server, and determining, using the selected grid server, whether the compared zone matches at least one zone stored on the selected server. Upon determination that the compared zone matches at least one zone stored on the selected server, the compared zone can be deduplicated. Upon determination that the compared zone does not match at least one zone stored on the selected server, a determination can be made as to whether the compared zone matches at least one zone stored on another server in the plurality of grid servers using a listing of zone stamps specific to the another server.

In some implementations, the listing in the plurality of zone stamps can be a listing of zone stamps for all servers in the plurality of grid servers.

In some implementations, the method can further include segmenting the data stream into the plurality of segments of data, determining a maximum zone size of a zone for deduplication by each grid server in the plurality of grid servers, and determining a ratio of the maximum zone size to a size of each segment of data in the plurality of segment of data. Selection of the grid server can be based on the determined ratio.

In some implementations, the method can further include selecting a plurality of grid servers for performing the deduplicating of the zone contained within the forwarded segment of data.

In some implementations, the method can further store the deduplicated zone on the selected grid server. Additionally, the method can include forwarding, by the selected grid server, the deduplicated zone to another grid server in the plurality of grid servers upon determination by the selected grid server that storage of the deduplicated zone exceeds a storage capacity of the selected grid server.

In some implementations, the selection, forwarding and deduplicating can be performed in parallel for at least a portion of segments of data in the plurality of segments of data using at least a portion of grid servers in the plurality of grid servers.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 illustrates an exemplary data deduplication system for deduplicating a stream of data received from a variety of sources, according to some implementations of the current subject matter;

DETAILED DESCRIPTION

Figure 2A:
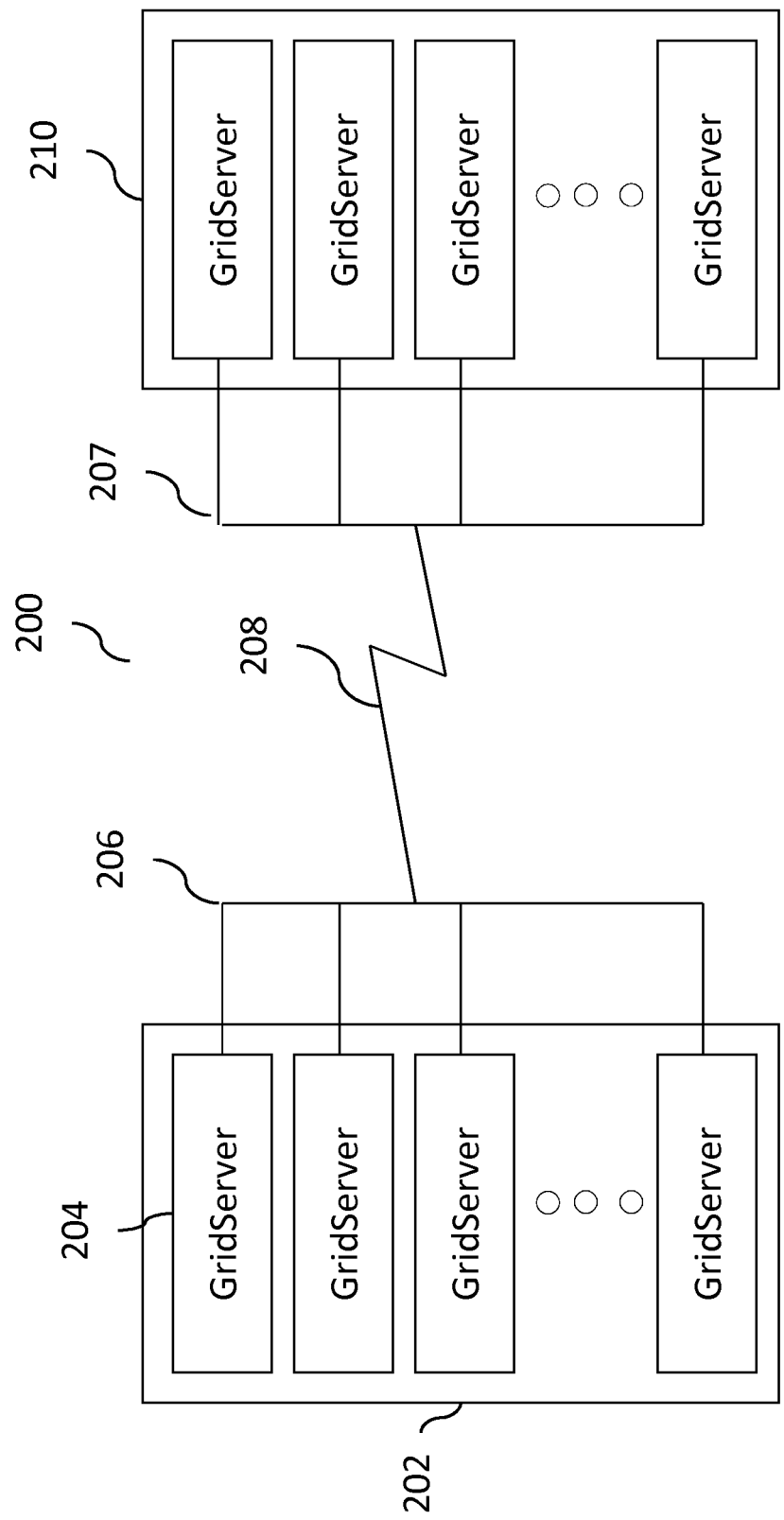
FIG. 2a illustrates an exemplary network, according to some implementations of the current subject matter.

To address these and potentially other deficiencies of currently available solutions, one or more implementations of the current subject matter provide methods, systems, articles or manufacture, and the like that can, among other possible advantages, provide for parallelizing and deduplicating backup data.

In some implementations, the current subject matter can perform processing of one or more streams of data (e.g., backup streams of data or any other data streams). The data stream can include a plurality data zones and each zone can be associated with a zone stamp that can identify that zone. The current subject matter can generate such zones and zone stamps based on the analysis of the received data steam(s). The zone stamps can be compared to one another (whether or not the zones are within the same data stream or not).

Deduplication can reduce data storage capacity consumption and/or inter-site network bandwidth requirements. Further, data deduplication can reduce an amount of data storage capacity that can be consumed by primary, backup, archive, etc. data storage systems. Further, deduplication can be effective in eliminating redundant data from being transferred across cost and/or bandwidth limited inter-site networks. Deduplication methods can be executed within and/ or among a logical collection of internetworked compute and/or data storage servers, which can be referred to as grid servers. Grid servers can receive incoming stream(s) of data for deduplication, store data locally, and/or optionally replicate and store remotely for some period of time. From this incoming data, zones can be created. Zones can be contiguous and/or non-contiguous segments of the incoming data, e.g., entire files, segments of files, an aggregation of multiple files, etc. For each zone in a data stream, a zone stamp can be generated and/or computed based on a content of the zone's data bytes.

A zone stamp can be a string containing up to 64 characters (and/or any other number of characters), which, in some exemplary implementations, can be smaller than or equal to the size of the zone it represents. Because of the smaller size of zone stamps, the entire list of zone stamps can be stored in a main memory (e.g., a high-speed memory location) to allow them to be quickly and/or efficiently compared to each other in order to identify zones whose content is similar and/or identical and/or substantially identical to one another. Such zones of data can then be delta compressed against each other so that the zones can be replaced by one unaltered zone and another delta compressed zone that can contain just the bytes that are different between the zones.

In some implementations, the current subject matter relates to a deduplication grid server network that can perform deduplication of data. The grid server network can include a plurality of grid servers or nodes that are communicatively coupled to one another, where each grid server can include disk storage capacity, processing units, memory capacity, and/or networking ports for performing deduplication methods. The servers can be communicatively coupled using any type of network (e.g., wide area network ("WAN"), local area network ("LAN"), metropolitan area network ("MAN"), internet, extranet, intranet, and/or any other type of wireless and/or wired network).

Using the grid server architecture, each grid server can execute grid deduplication methods on data that can be stored within its own server. This process can be performed by the grid server independently and/or in parallel with other grid servers in the grid server network. Further, since grid servers can be interconnected via the grid server network, they can cooperate and/or communicate with one another to perform deduplication of data across all grid servers in the deduplication grid server network. This grid deduplication activity within and among multiple grid servers can provide scalable performance that can be commensurate with primary storage capacity growth.

Additionally, a loss of any grid server(s) within the network may affect the availability of the zones that it is responsible for storing, however, the current subject matter's grid server network can provide for failover/recovery models, whereby each grid server in the network can be a peer within the grid server network and any services can be relocated from the failed grid server to the remaining operational grid servers.

FIG. 1 illustrates an exemplary data deduplication system 100 for deduplicating a stream of data received from a variety of sources 109 (a, b, c, d, e, f, g). The source 109 can include an archive server 109a, a database server 109b, an email server 109c, a file server 109d, a backup server 109e, a document management server 109f, a replication server 109g, as well as any other application, business object, business process, business process application, server, software, hardware, etc. The system 100 can further include deduplication grids 102, 104 and networks 111, 112. The network 111 can communicatively couple the deduplication grid 102 and source of a data stream 109 and the network 112 can communicatively couple the deduplication grid 102 and the deduplication grid 104. In some implementations, the deduplication grid 102 can be located in the same physical location as the sources 109. Alternatively, the grid 102 can be remote from the sources 109. The grid 104 can be remotely located from the sources 109 and/or grid 102. For example, the grid 104 can be a disaster recovery site for the data received from the source 109.

The grids 102 and/or 104 can include one or more computing devices, systems, servers, hardware, software, and/or any combination of hardware and/or software, which can be communicatively coupled with one another using various wireless and/or wired connections, networks, etc. The networks 111, 112 can be any wireless and/or wired networks, WAN, MAN, LAN, Internet, extranet, intranet, as well any other type of network.

In some embodiments, the deduplication grid 102 can receive data stream(s) from sources 109 and can perform an initial deduplication of the received data. Additionally, the grid 102 can also perform reconstituting original un-deduplicated data, when requested to do so by source(s) 109. The deduplicated data can be stored in a storage subsystem local to the grid 102 (not shown in FIG. 1). The deduplicated data can be sent to grid 104 and stored in a storage subsystem local to the grid 104 (not shown in FIG. 1). For example, critical application data can be stored at a local facility (e.g., as represented by the grid 102) and at a geographically distant remote facility (e.g., as represented by the grid 104) in order to provide for a full recovery in the event of system failure, site disaster, or any other unprecedented condition or event.

FIG. 2a illustrates an exemplary network 200, according to some implementations of the current subject matter. The network 200 can include a plurality of network sites 202 and 210 are shown in FIG. 2a), each having a deduplication grid containing a plurality of deduplication grid servers 204. The grid servers 204 within each site 202 and 210 can be communicatively coupled using any wireless and/or wired networks, WAN, MAN, LAN, Internet, extranet, intranet, as well any other type of network 206 and/or 207. The sites 202 and 210 can be communicatively coupled using any wireless and/or wired networks, WAN, MAN, LAN, Internet, extranet, intranet, as well any other type of network 208.

In some implementations, the current subject matter can provide a multi-stage and/or multi-level deduplication of streams of data, which can be received by one or more servers in the network 200. In some implementations, the data stream that can be received can be split into a plurality of zones that can be matched against one another in order to determine whether or not zones are similar to one another, identical, and/or substantially similar (e.g., zones that include similar data content). Zones having similar, identical, and/or substantially similar data content can be deduplicated using delta compression and/or data compression. Other zones that are not similar, identical, and/or substantially similar to any other zone in the received data stream can be further processed using data compression. These size-reduced zones can then be transmitted across network 208, which can save network bandwidth and accelerate the time it can take to replicate all of the zones.

In some implementations, the current subject matter can perform multiple sequential operations during processing of backup data stream(s) into deduplicated and/or replicated zones. The operations can include at least one of the following: backup stream splitting, stamp creation, stamp redistribution, stamp matching, grid delta compression, rebalancing, purging, and/or any other operations and/or any combination thereof. The zones can be purged from the server grid when they are no longer required to be accessed by any of these applications 109. In some implementations, stream splitting, stamp creation, stamp matching, grid delta compression, rebalancing, and/or purging can be performed asynchronously to one another. This can be done to maximize utilization of system resources. The following is a discussion of each of these processes and how such processes can be performed by each grid server in the grid independently while other processes are performed across other servers.

In some implementations, the current subject matter system can perform data stream (e.g., backup stream) splitting and/or stamp creation in accordance with an exemplary process described in U.S. Pat. No. 8,412,848 to Therrien et al., issued Apr. 2, 2013, which is incorporated herein by reference in its entirety. In some implementations, each grid server in the grid server network can perform data stream splitting independently and form zones based on the received data as well as create zone stamps for each formed zones. Each grid server can receive a data stream that can be specifically destined for that particular server and/or, alternatively, grid servers can receive one data stream that can be destined for the network and determine how to split the data stream for further processing by each grid server. Each grid server can create a stamp table that can represent all of the zones that were created within that grid server based on the data in the incoming data stream. The stamp tables can be virtual stamp tables. These stamp tables can be sorted from smallest to largest zone size in order to accelerate downstream stamp matching process. During stamp matching, zone stamps whose zone sizes are +/−P percent different in size can be considered for matching in order to accelerate the stamp matching process.

Figure 2B:
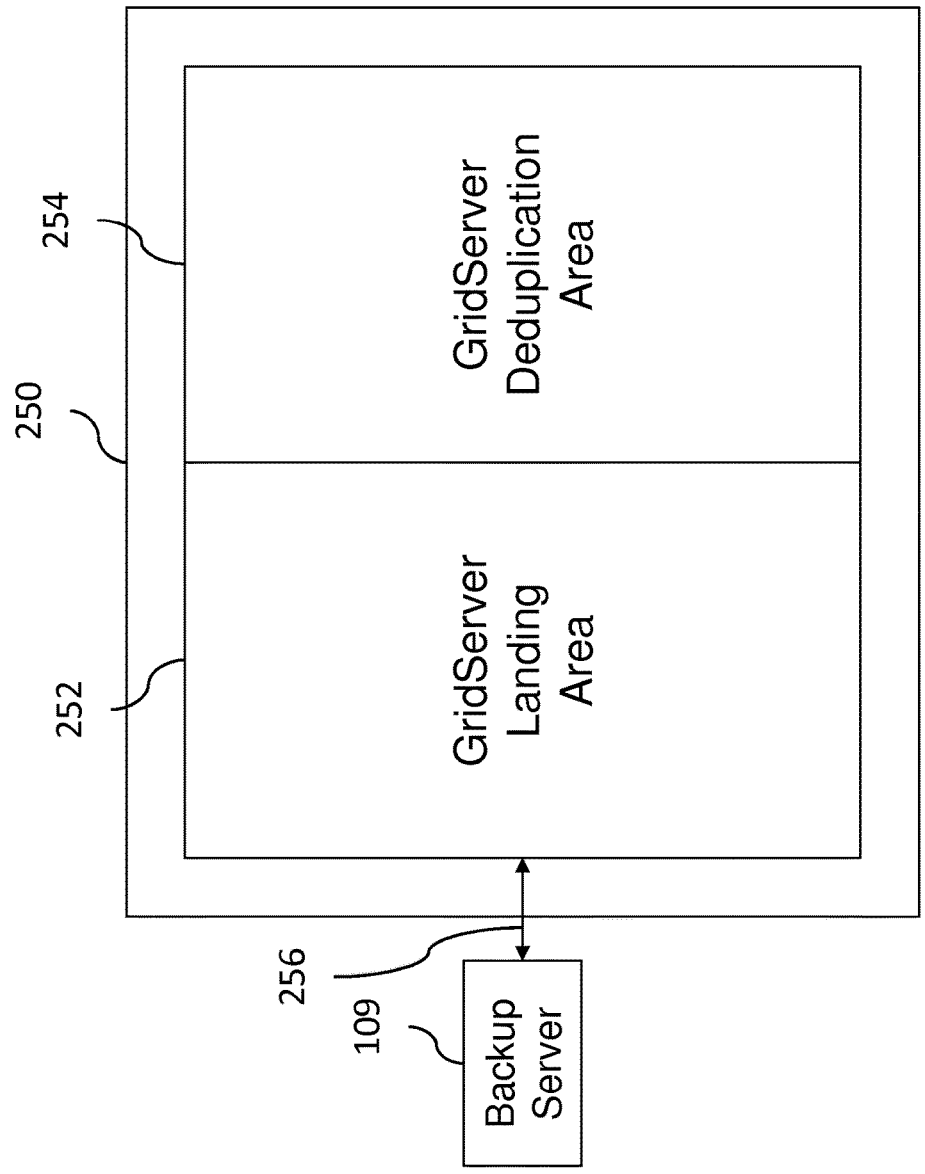
FIG. 2b illustrates an exemplary system for an internal logical storage structure of a grid server, according to some implementations of the current subject matter.

FIG. 2b illustrates an exemplary system 250 for an internal logical storage structure 250 of a grid server, according to some implementations of the current subject matter. The structure 250 can be included a grid server 204 (as shown in FIG. 2a) and can include a grid server landing area 252 and a grid server deduplication area 254. A backup server 109 (as shown in FIG. 1) can be communicatively coupled to the structure 250, and in particular, to the grid server landing area 252.

The backup server 109 can transmit streams of backup data 256 to the grid server 204 (as shown in FIG. 2a). The backup data stream 256 can be stored in the grid server landing area 252 for the purposes of "awaiting" performance of the backup process by performing compression and/or deduplication in parallel on incoming data stream 256. The grid server landing area 252 can include a sufficient storage capacity to cache at least the most recent full backup and/or one or more previous backups. The data stream 256 can be temporarily stored in the grid server landing area 252 and can provide at least one of the following benefits. Data backups can be completed in a shorter amount of time because deduplication and/or compression do not take place simultaneously.

Further, requests to restore data are typically directed to the most recent backup data. This data can be cached in the in the grid server landing area 252 until more backups streams cause that data to be "ejected" from grid server landing area 252 and into the grid server deduplication area 254. In some implementations, such requests to restore data from the grid server landing area 252 might not require that data is reassembled from deduplicated chunks (if the data is restored from the data that has been deduplication/replicated). The restored data can be residing in an uncompressed and/or undeduplicated form in the grid server landing area 252, which can accelerate restore operations.

Moreover, for backup system deployments where one or more grid servers are only deployed at a primary site and not at a secondary disaster recovery site, backup tapes can be created for storage offsite at a tape storage facility. These tapes can be produced from the grid server landing area 252 as soon as a backup job is completed. With the most recent backup data stored in uncompressed and/or undeduplicated form in the grid server landing area 252, the throughput of creating a tape copy can be accelerated as opposed to creating a tape copy from deduplicated data, which can require undeduplication (or "rehydration") of data before writing it to tape.

Additionally, for virtual machine backups, the grid server landing area 252 can provide a fast and accessible NAS storage area for performing an instant recovery of data using the grid server 204 as a temporary primary storage subsystem in the event of a loss of one or more virtual machine primary storage subsystems. This can accelerate the time that it can take to recover from the loss of virtual machine primary storage.

In some implementations, data stored in the grid server landing area 252 can be deduplicated at any time and the resulting data can be stored in the grid server deduplication area 254 of the grid server 204. In some implementations, the current subject matter can perform a determination as to when to move the data stored in the grid server landing area 252 to the grid server deduplication area 254.

In some implementations, the grid server 204 can perform at least one of the following functions: backup/ingestion, deduplication, replication, and/or other functions/tasks.

The backup/ingestion function relates to receiving data from data management applications 109. Applications 109 typically send large amounts of data (e.g., gigabytes to terabytes) into one or more grid servers 204 (shown in FIG. 2a) for processing. The data can be sent based on a particular schedule that can be set by a backup administrator of the application 109. Minimizing an elapsed time to complete all daily backup jobs can be most critical to the backup administrator, since certain customer-facing applications may need to be paused until the backup is complete, and end-users that access that application can be delayed in performing their work until the backup task is complete.

Another function that can be performed by the grid server 204 can be deduplication. Deduplication tasks can be designed to receive data stream that has been ingested into the grid server 204 by a data management application, and segment it into zones. Each zone can be labeled a zone stamp, which can be an identifier that can be used to identify zones that have similar, substantially similar, substantially identical, and/or identical content. During the deduplication task, collection of zone stamps associated with newly created zones from a recent ingestion data stream can be compared against zone stamps that were previously created in order to identify similar zones using similarity of their respective stamps. When a pair of zones is identified as having similar zone stamps, the zones can be delta-compressed to reduce consumed data storage capacity.

Yet another function of the grid server 204 can be replication. In some implementations, a grid server 204 within the data center 202 can optionally have their backup data replicated across a network 208 to grid servers at another site 210. The site 210 can be referred to as a disaster recovery site. A backup administrator can define a predetermined recovery point objective ("RPO") for each backup data set based on, for example, criticality of the data. The RPO can be a measure of time (e.g., seconds, minutes, hours, etc.) that can represent an age of data at the second site as compared to the age of data stored at the primary site. Ideally, an RPO of zero seconds can allow an organization to resume operations up to the last transaction prior to the disaster at the primary site using grid servers at the second site. For most data, RPO can be specified in terms of hours, e.g., less than 24 hours.

In some implementations, other tasks that can be run by grid servers 204 can include at least one of the following: a restore task, a copy-to-tape task, a cross replication task, a purge task, a rebalance task, etc. In some implementations, the current subject matter can dynamically manage each of these additional grid server tasks and/or any other tasks. Further, the current subject matter can balance backup/ingestion tasks versus deduplication and/or replication tasks. In some implementations, the current subject matter, for the purposes of running these and/or any other tasks on the grid server 204, can dynamically manage grid server 204 processing, memory, networking, storage and/or any other resources to ensure that ingestion performance is not inhibited as well as to perform as much deduplication and/or replication as possible without reducing the ingestion rate. Ingestion performance can be one of the most important customer-visible criteria because the fastest ingestion performance can correspond to the shortest time to backup, thereby affecting end-user productivity if data backups take too long to complete. Further, during certain periods of time, ingestion performance can drop significantly due to delays introduced by the data management application, and/or bursty network protocols (e.g., NFS, CIFS), and/or slow data feeds from backup clients. The current subject matter can perform monitoring of the ingestion rate and upon determination that the rate is low, the grid server 204 can be instructed to increase deduplication and/or replication activity automatically. This can reduce recovery point objective time for data that is replicated to the second site 210.

Figure 3:
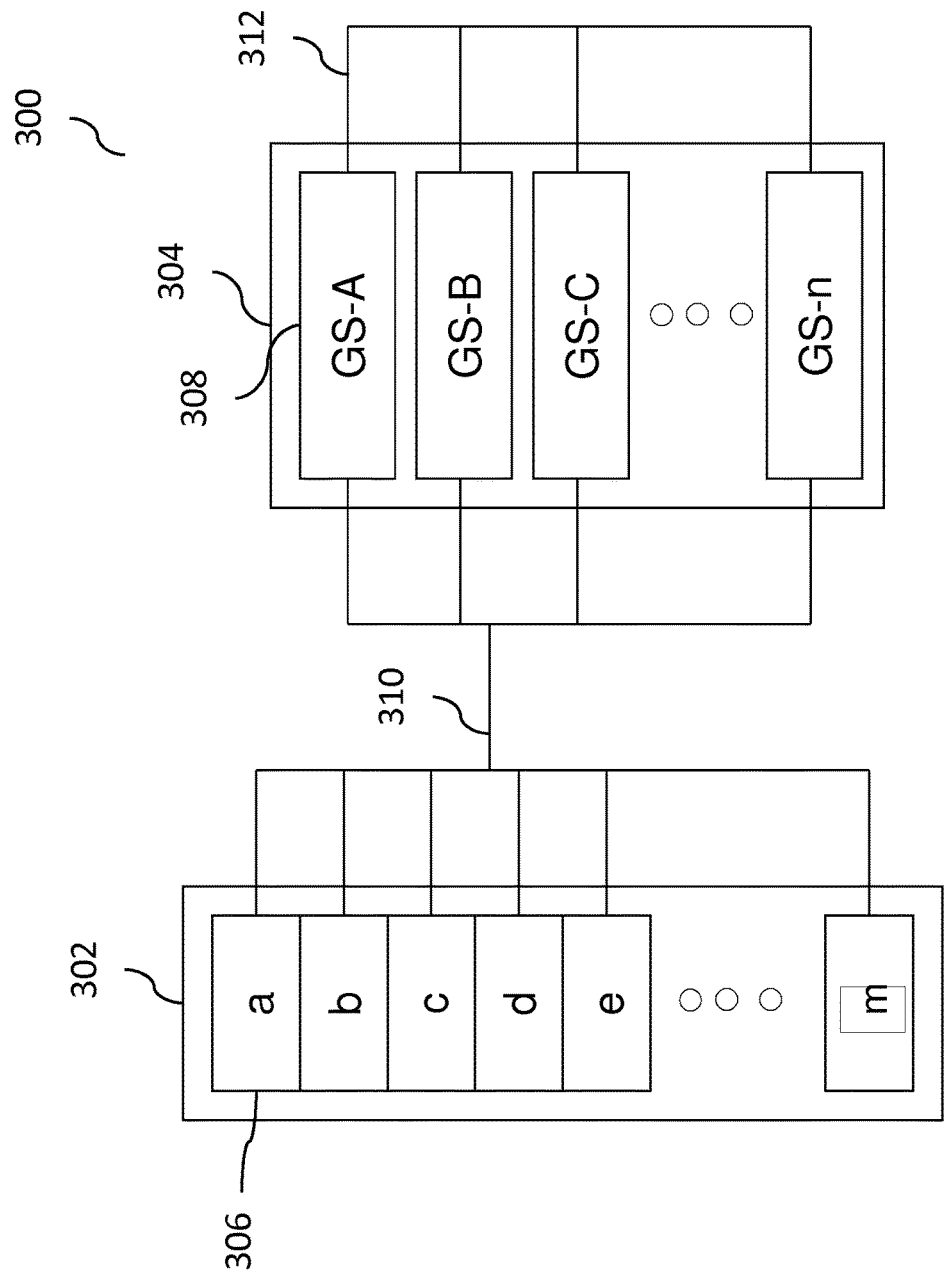
FIG. 3 illustrates an exemplary system for performing a backup of data, according to some implementations of the current subject matter.

FIG. 3 illustrates an exemplary system 300 for performing a backup of data, according to some implementations of the current subject matter. The system 300 can include a deduplication system 304 including a plurality of grid servers GS-A, GS-B, GS-C, . . . GS-n 308. The grid servers 308 can be communicatively coupled using a backend network 312. The network 312 can be any type of wireless and/or wired network (e.g., Internet, extranet, intranet, WAN, MAN, LAN, etc.). A backup image 302 can be supplied to the deduplication system 304 for processing via a front-end network 310. Similarly, the front-end network 310 can be any type of wireless and/or wired network (e.g., Internet, extranet, intranet, WAN, MAN, LAN, etc.). The backup image 302 can include a plurality of segments a, b, c, . . . m (m is an integer) 306. In some implementations, the entire backup image 302 can be supplied to the deduplication system 304 for processing. Alternatively, separate segments 306 can be supplied to the deduplication system 304 for processing. In some implementations, segments 306 can be distributed among the grid servers 308 based on various parameters (e.g., processing capability of a server, current load of the server, storage size of the server, etc.). In some implementations, the backup image 304 can be a very large backup image (e.g., 100 terabyte backup image).

In some implementations, data contained in the segments 306 can be ingested by grid servers 308 through the network 310 and deduplicated within grid servers 308, which a grid server ingests and deduplicates the segment 306 that has been sent to it for processing. Further, data from each grid server 308 can be deduplicated among all grid servers 308 through the back-end network 312.

In some implementations, each segment 306 can represent a series of contiguous bytes of the original backup image 304 and grid servers 308 can be destinations where these segments can be directed for deduplication processing.

When a segment 306 is assigned to a grid server 308 during a backup process, the grid server 308 can split the assigned segment 306 into one or more zones. Each such zone and its associated zone stamp can be created in accordance with the process disclosed in the co-owned U.S. Pat. No. 8,412,848 to Therrien et al., issued Apr. 2, 2013, as well as co-owned and co-pending U.S. patent application Ser. No. 14/633,366 to Hansen et al., filed Feb. 27, 2015 and entitled "Scalable Grid Deduplication", the disclosures of which are specifically incorporated herein by reference in their entireties.

In some implementations, the deduplication system 304 can assign and send each segment 306 of the backup image 302 that it receives to one or more grid servers 308 contained within the deduplication system 304. The deduplication system 304 can also ensure that each segment 306 as well as other data segments (of the same or other backup images) that are received by it can be optimally deduplicated. The deduplication system 304 can include an assignment component that can determine which grid server 308 is to receive a particular data segment 306 and assign that data segment to the selected grid server 308 for deduplication. Further, the deduplication system 304 can perform management of deduplication within each grid server (local deduplication) and among all grid servers 306 (global deduplication). In some implementations, the local and global deduplication processes can be implemented as a single-phase process where a single global stamp table for the entire deduplication system can be used to allow each new zone of each new data segment 306 to be similarity matched to another zone regardless of the grid server it was initially directed to. In alternate implementations, the local and global deduplication process can be implemented as a two-phase process. In the first phase, zones of data segments 306 can be matched with zones within the same grid server 308 in order to minimize traffic on the backend network 312, which can accelerate the deduplication process. In the second phase, stamp tables, containing zone stamps, from each grid server 308 can be analyzed to identify zones that were not matched within the same grid server 308 during the first phase so that these zones can be deduplicated together with zones from other grid servers.

Figure 4:
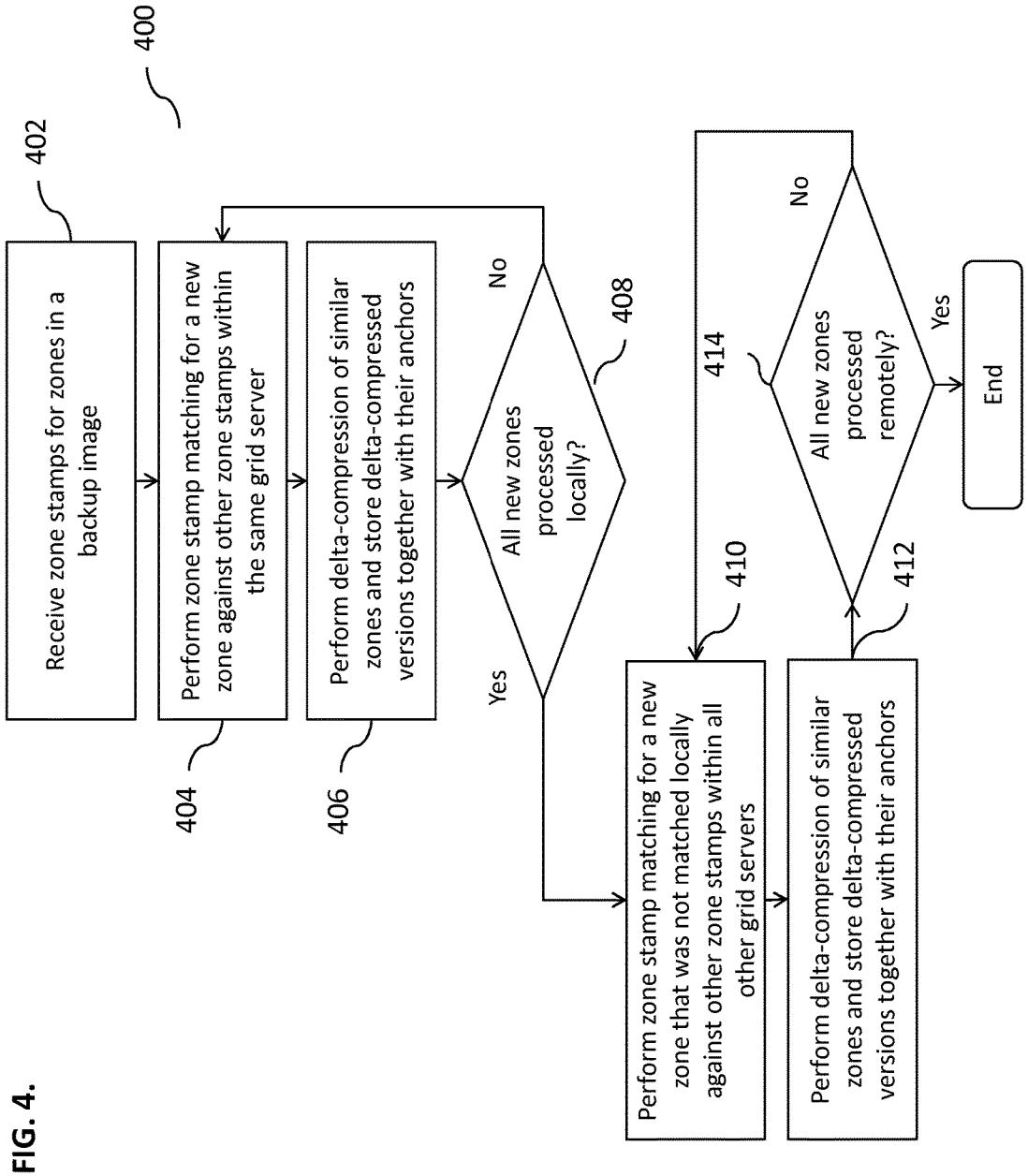
FIG. 4 is a flowchart illustrating an exemplary two-phase deduplication process that can be performed by the system shown in FIG. 3, according to some implementations of the current subject matter.

FIG. 4 is a flowchart illustrating an exemplary two-phase deduplication process 400 that can be performed by the system 300 (shown in FIG. 3), according to some implementations of the current subject matter. The process 400 can begin, at 402, by receiving a backup data stream for process (e.g., deduplication, delta-compression, etc.). Zones within the data streams can be identified and zone stamps for those zones can be generated. The zone determination and zone stamp generation can be performed in accordance with an exemplary process described in U.S. Pat. No. 8,412,848 to Therrien et al., issued Apr. 2, 2013, which is incorporated herein by reference in its entirety. The zone along with corresponding zone stamps can be received by a particular grid server and/or all grid servers.

At 404, zone stamp matching for each new zone that is received can be performed within a particular grid server. The new zone can be compared to zones that have been already processed by that grid server. In some implementations, the new zone can be compared to zones processed by other grid servers within a deduplication system.

At 406, once similar zones are identified, delta-compression process of similar, identical, and/or substantially similar zones can be performed. The delta-compressed version generated as a result of the delta-compression process can be stored in that grid server. The delta-compressed versions can be stored individually and/or clustered together with an anchor version. Delta-compressed version clustering and/or anchoring can be performed in accordance with an exemplary process described in U.S. patent application Ser. No. 13/961,259 to VanderSpek et al., filed Aug. 7, 2013, and entitled "Delta Version Clustering and Re-Anchoring", which is incorporated herein by reference in its entirety.

At 408, the grid server that performed operations 402-406 (and/or the deduplication system containing that grid server) can then determine whether all new zones have been processed locally by that grid server. If not, the process returns to 404 to continue processing newly received zones.

Once the determination has been made that all new zones have been processed locally (i.e., at the grid server receiving the new zone), the processing proceeds to 410. At 410, the zone stamp matching process can be performed against other zone stamps of zones stored in other grid servers within the deduplication system (e.g., deduplication system 304 shown in FIG. 3). The deduplication system can be a single deduplication system containing one or more grid servers and/or can be a collection of communicatively coupled multiple deduplication systems. This can be referred to as "remote" matching.

At 412, if matching zone stamps are found at other grid servers contained within the deduplication system, delta-compression process of similar, identical, and/or substantially similar zones can be performed. The delta-compressed versions can be stored individually and/or clustered together with an anchor version. Delta-compressed version clustering and/or anchoring can be performed in accordance with an exemplary process described in U.S. patent application Ser. No. 13/961,259 to VanderSpek et al., filed Aug. 7, 2013, and entitled "Delta Version Clustering and Re-Anchoring", which is incorporated herein by reference in its entirety. The delta-compressed versions can be stored by each grid server individually, e.g., each grid server stores an individual copy of the delta-compressed version. Alternatively, the delta-compressed versions can be stored together with an anchor based on a storage location of the anchor. In some implementations, the anchor's storage location can be ascertained and the newly delta-compressed version can be transferred to that storage location for "attachment" to the anchor. In some implementations, the delta-compressed versions and/or their anchors can be transferred between grid servers and/or storage locations (e.g., local, remote, disaster recovery, and/or any other locations, etc.) as desired and/or as required (e.g., to balance storage, to secure data, to recover data, to retrieve data, etc.).

At 414, the process 400 can determine whether all new zones have been processed remotely (i.e., new zone's zone stamp compared against zone stamps of other grid servers). If not, the process returns to 410 to continue processing zones. Otherwise, the process terminates.

The effectiveness of the deduplication process can be dependent on the ratio of a segment size to a zone size. The segment size can be defined by a backup administrator within the backup application, by the deduplication system, and/or predetermined in any other fashion. The segment size can be usually determined using hard split points based on a user-specified byte count within the backup application. The segment size is not necessarily dependent on a content-based stream splitting model. Within each grid server, each segment can be split into zones based on a content-defined splitting model. These can be natural break points within data content that can absorb insert/delete modifications within each segment. In some exemplary, non-limiting implementations, the segment size can be selected so that it can contain hundreds to thousands of zones to benefit from the natural content-based split points of zones and only incur a hard segment split point infrequently. Further, in some implementations, it is possible that first and last zones of a segment are less likely to deduplicate well because of the segment's hard split points.

Figure 5:
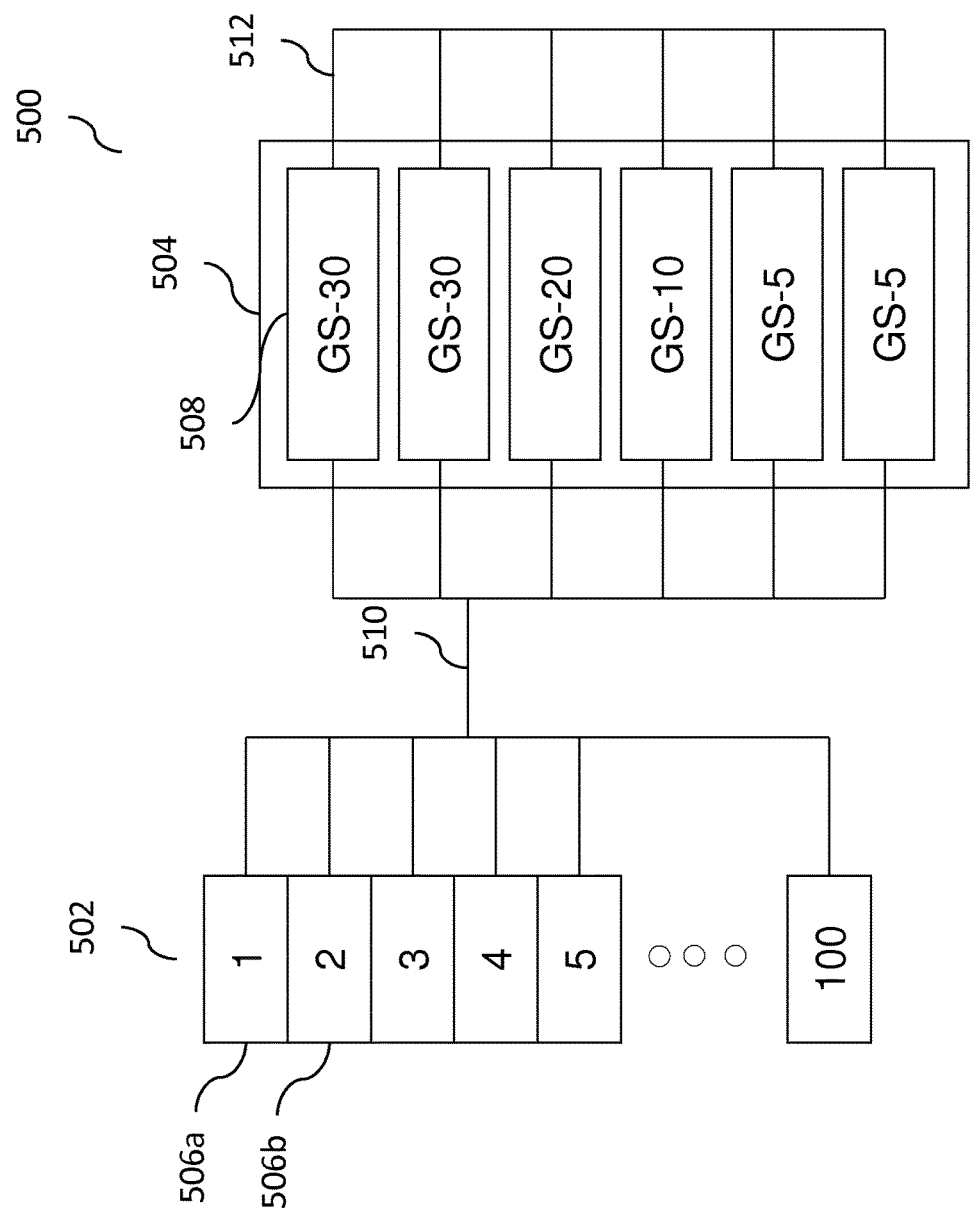
FIG. 5 illustrates an exemplary system for performing a backup of data, according to some implementations of the current subject matter.

FIG. 5 illustrates an exemplary system 500 for performing a backup of data, according to some implementations of the current subject matter. System 500 is similar to system 300 shown and described in connection with FIG. 3. In some exemplary, non-limiting implementations, the system 500 can include a deduplication system 504 having a plurality of grid servers 508, including two GS-30 grid servers, one GS-20 grid server, one GS-10 grid server, and two GS-5 grid servers. The grid servers 508 can be communicatively coupled using a backend network 512. The network 512 can be any type of wireless and/or wired network (e.g., Internet, extranet, intranet, WAN, MAN, LAN, etc.). A backup image 502 can be supplied to the deduplication system 504 for processing via a front-end network 510. Similarly, the front-end network 510 can be any type of wireless and/or wired network (e.g., Internet, extranet, intranet, WAN, MAN, LAN, etc.).

In some exemplary, non-limiting implementations, the backup image 502 can include a plurality of segments 506, e.g., 100 segments 1, 2, 3, ... 100. In some implementations, similar to the system 300, the entire backup image 502 can be supplied to the deduplication system 504 for processing, and/or separate segments 506 can be supplied to the deduplication system 504 for processing. In some implementations, segments 506 can be distributed among the grid servers 508 based on various parameters (e.g., processing capability of a server, current load of the server, storage size of the server, etc.). In some implementations, the backup image 504 can be a very large backup image (e.g., 100 terabyte backup image), larger than the storage capacity of any one grid server.

The deduplication system 504 can assign and send each segment 506 of the backup image 504 that it receives to one or more grid servers 508 contained within the deduplication system 504. The deduplication system 504 can also ensure that each segment 506 as well as other data segments (of the same or other backup images) that are received by it can be optimally deduplicated, as discussed above with regard to FIGS. 3-4.

In some implementations, grid servers 508 can have a varying storage capacity and can be combined within a single grid deduplication system 504. As an example, to support a 100 terabyte ("TB") backup image, six different grid servers 508 can be used, where grid servers can have the following processing/storage capacities of 30, 30, 20, 10, 5, and 5 TB, as shown in FIG. 5. During the backup process, the 100 TB database can be hard split into one hundred 1 TB segments 506 (where segment 506a is 1 TB, segment 506b is 1 TB, etc.), as shown in FIG. 5. Each grid server can accept the amount of storage that it can maximally accommodate, i.e., a GS-30 grid server can accept up to 30 TB of data for processing. When a particular grid server becomes full, it can generate a warning/error message indicating that it cannot accept any further data for processing. The backup server can continue to backup up any remaining data in that segment by re-directing it to a different grid server, and/or it can resend the entire segment to another grid server that has available capacity. In some implementations, the grid servers 508 can have the same and/or different processing/storage capacity.

Figure 6:
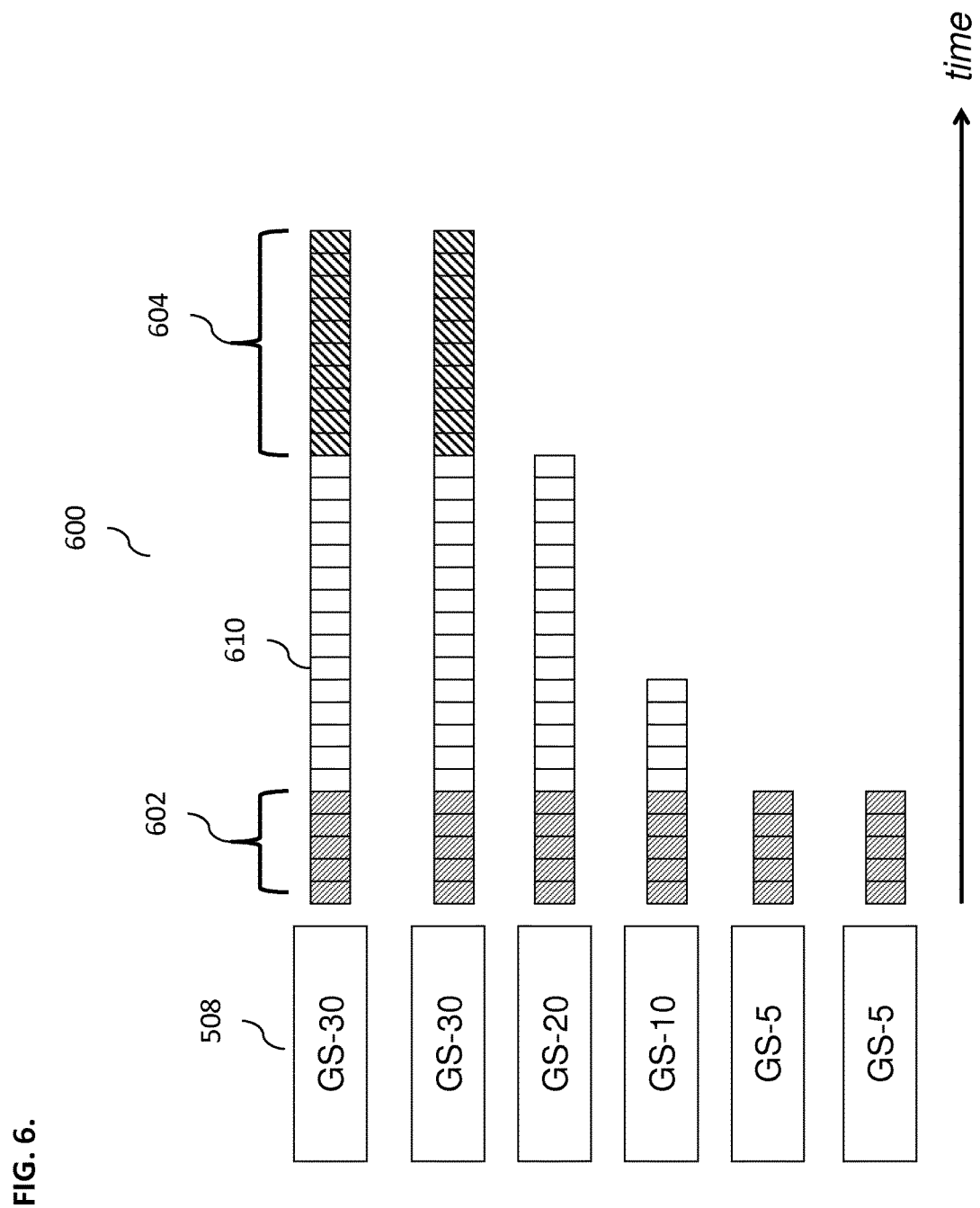
FIG. 6 is an exemplary plot illustrating a backup process performed by the system shown in FIG. 5, according to some implementation of the current subject matter.

FIG. 6 is an exemplary plot 600 illustrating a backup process performed by the system 500 shown in FIG. 5, according to some implementation of the current subject matter. The plot 600 is a time-based plot indicating how many "time units" 610 it can take each server 508 to complete a backup of data having a certain size. Thus, each of the GS-30 grid servers can consume approximately 30 time units 610 to complete backup of 30 TB of data; the GS-20 grid server can consume approximately 20 time units 610 to complete backup of 20 TB of data; the GS-10 grid server can consume approximately 10 time units 610 to complete backup of 10 TB of data; and each of the GS-5 grid servers can consume approximately 5 time units 610 to complete backup of 5 TB of data.

In some implementations, homogenous processing capacity of the grid servers can ensure adequate load balancing across grid servers and thus, more efficient backup. As shown in FIG. 6, the first 30 TB of 100 TB backup data, shown as first five time units 602 (similarly shaded) can leverage available capacity in all six grid servers 508 shown in FIG. 6 (i.e., (6 grid servers×5 TB of data). The remaining 20 TB of the 100 TB backup data, shown as last ten time units 604 (similarly shaded) can only be processed by the two largest grid servers, i.e., GS-30 servers (assuming that the performance across all grid servers 508 remains the same throughout the backup process).

In some implementations, if all grid servers 508 were identical and/or similar in processing/storage capacity (e.g., all 17 TB), approximately 17 time units can be consumed to complete the same 100 TB backup. In some implementations, to improve performance of the grid servers, it may be desirable to implement smaller grid servers that can operate in parallel as opposed to fewer large grid servers.

Figure 7:
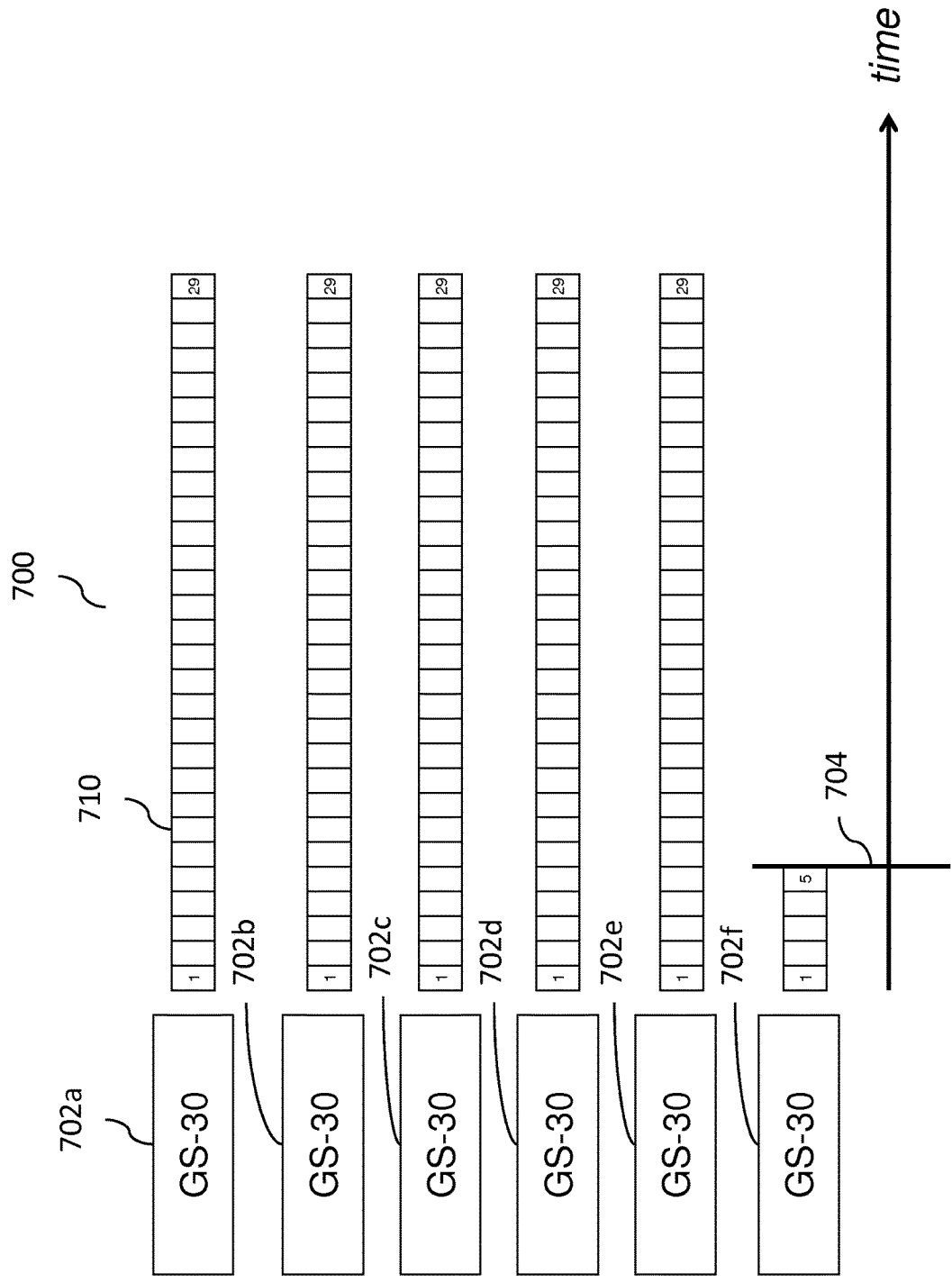
FIG. 7 is an exemplary time-based plot illustrating a backup process performed by a deduplication system where all grid servers have the same processing/storage capacity, according to some implementation of the current subject matter.

FIG. 7 is an exemplary time-based plot 700 illustrating a backup process performed by a deduplication system where all grid servers have the same processing/storage capacity, according to some implementation of the current subject matter. This system can be desired for the purposes of overprovisioning of grid servers to ensure occurrence of a successful backup of data. The plot illustrates backup operations with regard to a backup of a 100 TB data.

As shown in FIG. 7, all servers 702 (*a, b, c, d, e, f*) can have the same processing/storage capacity to 30 TB (i.e., all are GS-30 servers). The plot 700 shows time units 710 that may be consumed to complete backup of data. All six grid servers 702 can potentially accommodate 180 TB of data, where each grid server 702*a-e* can consume 29 time units to complete 30 TB of data, where the grid server 702*f* was able to complete 5 time units and has failed thereafter, as discussed below.

In some implementations, five 30 TB grid servers 702 can accommodate 150 TB backup image and any single grid server failure can cause the backup process to fail due to a lack of available capacity. A sixth 30 TB grid server can alleviate this problem and allow backup to proceed, as the loss of a single grid server (e.g., due to system error, failure, disaster, etc.) can allow the backup of the 150 TB backup to be successfully completed (assuming that the failed grid server has not permanently failed and can be restored by the time a restore request is issued). As shown in FIG. 7, grid server 702*f* has failed at time 704. All segments that have been directed to the failed grid server 702*f* can be accommodated by the processing/storage capacity that can be available in the remaining grid servers 702*a-e* (assuming they have not failed as well).

In some implementations, the over-provisioning can have an additional benefit of reducing the backup time by allowing an extra grid server to assist in the overall completion of all backup segments. Unlike conventional array of inexpensive disks ("RAID") schemes, where one system "element" can be set aside as a hot-spare awaiting the failure of another element, the current subject matter's overprovisioning of grid servers can use all of the grid servers to improve performance and/or provide resiliency. The degree of overprovisioning can be increased beyond a single grid server in order to be able to survive multiple grid server failures during a single backup. The number of servers and/or their processing/storage capacity can be changed to accommodate any size of backup of data. This determination can be based on a variety of factors, including historical data, system preferences, anticipated increase in size of backup data, etc.

Figure 8:
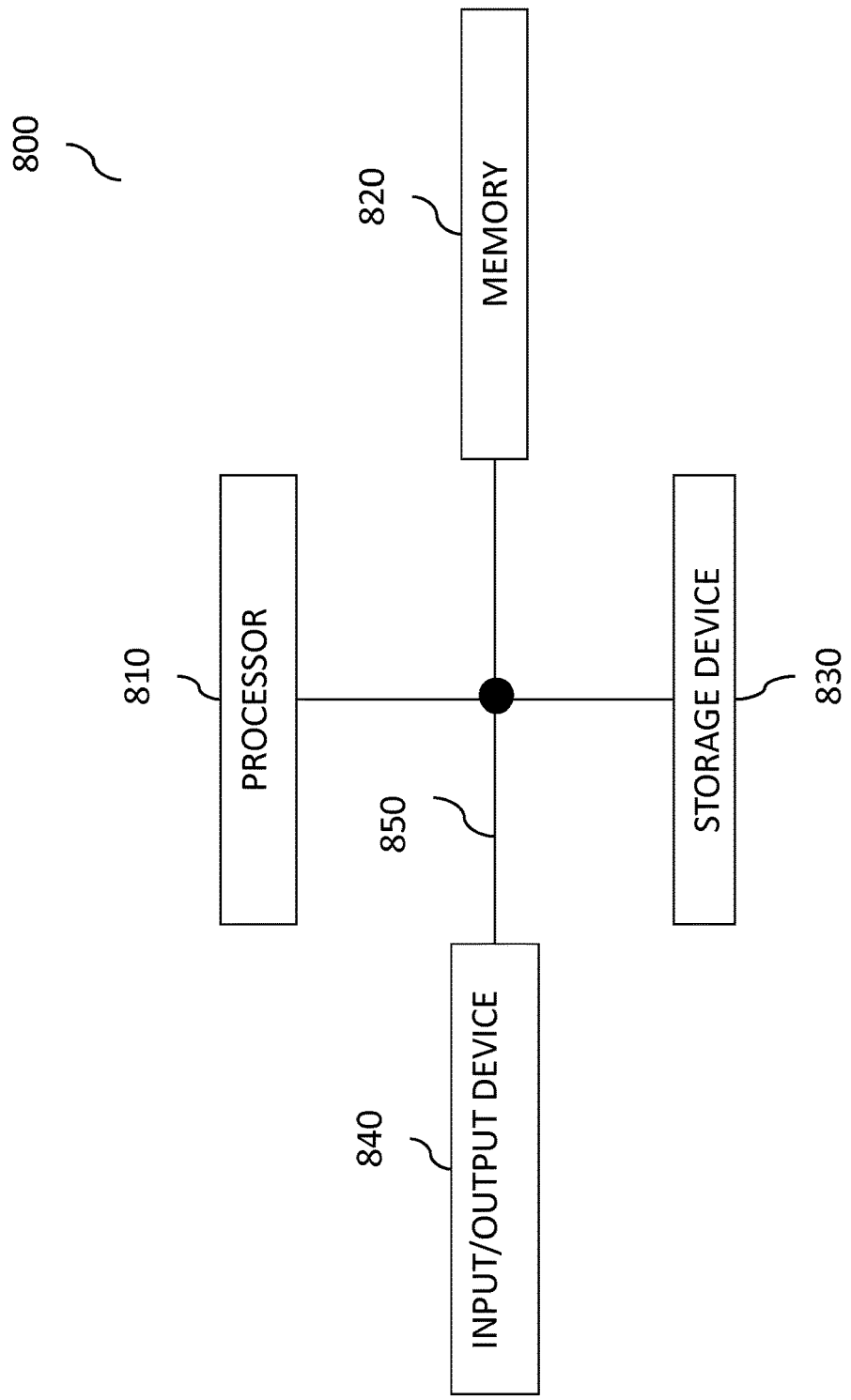
FIG. 8 illustrates an exemplary system, according to some implementations of the current subject matter.

In some implementations, the current subject matter can be configured to be implemented in a system 800, as shown in FIG. 8. The system 800 can include a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
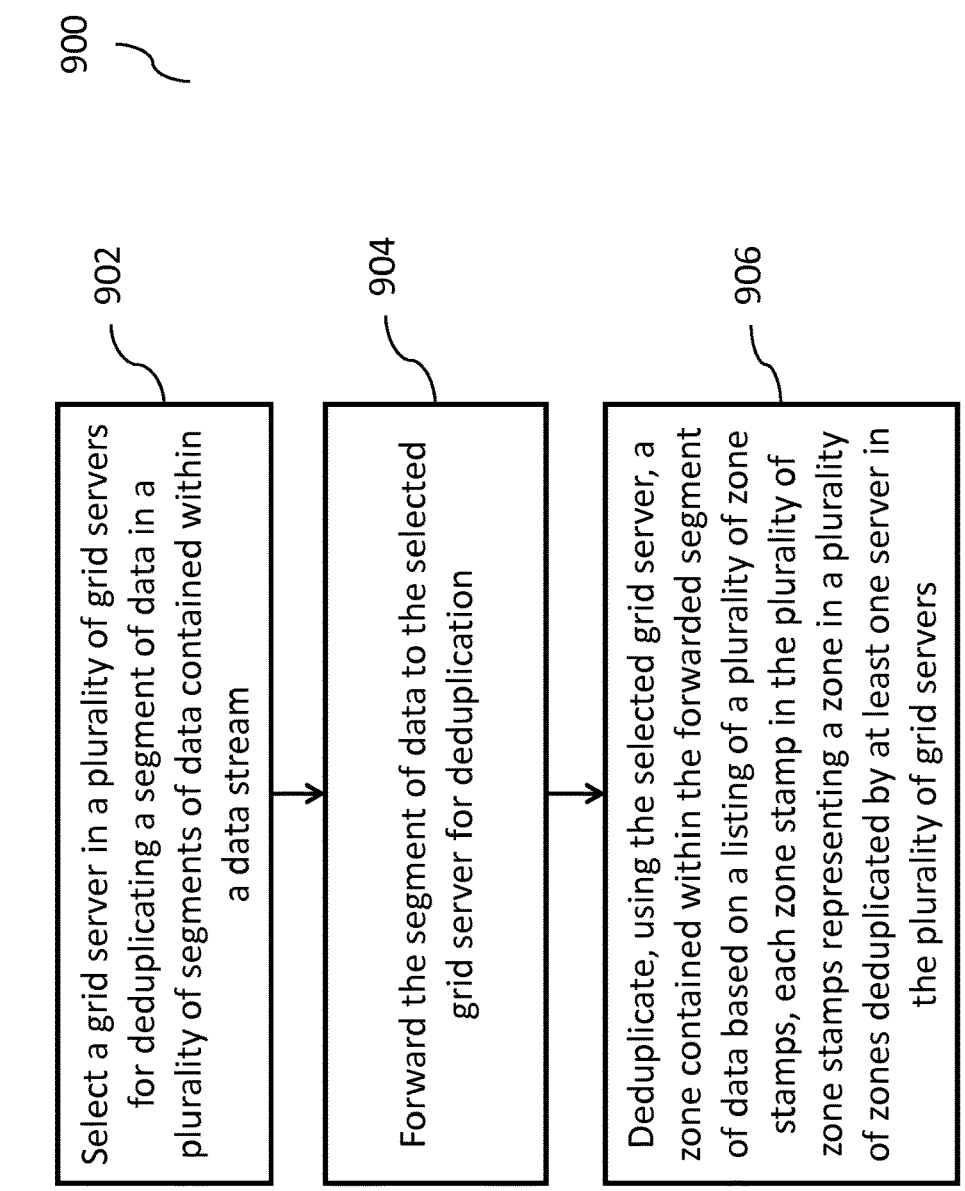
FIG. 9 illustrates an exemplary method, according to some implementations of the current subject matter.

FIG. 9 illustrates an exemplary method 900 for performing a backup of data, according to some implementations of the current subject matter. The method 900 can be performed by the systems shown and discussed above with regard to FIGS. 1-8. At 902, a grid server in a plurality of grid servers can be selected for deduplicating a segment of data in a plurality of segments of data contained within a data stream. The segment of data can be forwarded to the selected grid server for deduplication, at 904. At 906, a zone contained within the forwarded segment of data can be deduplicated using the selected server. The deduplication can be performed based on a listing of a plurality of zone stamps, where each zone stamp in the plurality of zone stamps can represent a zone in a plurality of zones deduplicated by at least one server in the plurality of grid servers.

In some implementations, the current subject matter can include one or more of the following optional features. The listing of the plurality of zone stamps can be a listing specific to the selected grid server. The deduplicating can include comparing, using at least one zone contained in the listing specific to the selected server, the zone contained within the forwarded segment of data to at least one zone stored on the selected server, and determining, using the selected grid server, whether the compared zone matches at least one zone stored on the selected server. Upon determination that the compared zone matches at least one zone stored on the selected server, the compared zone can be deduplicated. Upon determination that the compared zone does not match at least one zone stored on the selected server, a determination can be made as to whether the compared zone matches at least one zone stored on another server in the plurality of grid servers using a listing of zone stamps specific to the another server.

In some implementations, the listing in the plurality of zone stamps can be a listing of zone stamps for all servers in the plurality of grid servers.

In some implementations, the method 900 can further include segmenting the data stream into the plurality of segments of data, determining a maximum zone size of a zone for deduplication by each grid server in the plurality of grid servers, and determining a ratio of the maximum zone size to a size of each segment of data in the plurality of segment of data. Selection of the grid server can be based on the determined ratio.

In some implementations, the method 900 can further include selecting a plurality of grid servers for performing the deduplicating of the zone contained within the forwarded segment of data.

In some implementations, the method 900 can further store the deduplicated zone on the selected grid server. Additionally, the method 900 can include forwarding, by the selected grid server, the deduplicated zone to another grid server in the plurality of grid servers upon determination by the selected grid server that storage of the deduplicated zone exceeds a storage capacity of the selected grid server.

In some implementations, the selection, forwarding and deduplicating can be performed in parallel for at least a portion of segments of data in the plurality of segments of data using at least a portion of grid servers in the plurality of grid servers.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for deduplicating data, comprising:
    selecting a grid server in a plurality of grid servers for deduplicating a segment of data in a plurality of segments of data contained within a data stream, wherein a data deduplication system communicatively coupled to the plurality of servers is configured to split the data stream into the plurality of segments and select the grid server for deduplicating the segment of data;
    forwarding the segment of data to the selected grid server for deduplication; and
    deduplicating, using the plurality of grid servers, a zone contained within the forwarded segment of data using a listing of a plurality of zone stamps, each zone stamp in the listing of the plurality of zone stamps representing a zone in a plurality of zones previously deduplicated by at least one server in the plurality of grid servers, the deduplicating including
        determining, using the listing of the plurality of zone stamps, by a first grid server in the plurality of grid servers that a second grid server in the plurality of grid servers previously deduplicated a first zone in the plurality of zones having a first zone stamp matching to a second zone stamp of a second zone being processed by the first grid server, and
        transmitting, by the first grid server, the second zone to the second grid server for deduplication.

2. The method according to claim 1, wherein the listing of the plurality of zone stamps is a listing specific to the selected grid server.

3. The method according to claim 2, wherein the deduplicating further comprises
    comparing, using at least one zone contained in the listing specific to the selected server, the zone contained within the forwarded segment of data to at least one zone stored on the selected server;
    determining, using the selected grid server, whether the compared zone matches at least one zone stored on the selected server, wherein
        upon determination that the compared zone matches at least one zone stored on the selected server, deduplicating the compared zone;
        upon determination that the compared zone does not match at least one zone stored on the selected server, determining whether the compared zone matches at least one zone stored on another server in the plurality of grid servers using a listing of zone stamps specific to the another server.

4. The method according to claim 1, wherein the listing in the plurality of zone stamps is a listing of zone stamps for all servers in the plurality of grid servers.

5. The method according to claim 1, further comprising
    segmenting the data stream into the plurality of segments of data;
    determining a maximum zone size of a zone for deduplication by each grid server in the plurality of grid servers; and
    determining a ratio of the maximum zone size to a size of each segment of data in the plurality of segment of data;
    wherein the selecting of the grid server is based on the determined ratio.

6. The method according to claim 1, further comprising selecting a plurality of grid servers for performing the deduplicating of the zone contained within the forwarded segment of data.

7. The method according to claim 1, further comprising storing the deduplicated zone on the selected grid server.

8. The method according to claim 7, further comprising forwarding, by the selected grid server, the deduplicated zone to another grid server in the plurality of grid servers upon determination by the selected grid server that storage of the deduplicated zone exceeds a storage capacity of the selected grid server.

9. The method according to claim 1, wherein the selecting, the forwarding and the deduplicating is performed in parallel for at least a portion of segments of data in the plurality of segments of data using at least a portion of grid servers in the plurality of grid servers.

10. A system comprising:
    at least one programmable processor; and
    a non-transitory machine-readable medium storing instructions that, when executed by the at least one programmable processor, cause the at least one programmable processor to perform operations comprising:
        selecting a grid server in a plurality of grid servers for deduplicating a segment of data in a plurality of segments of data contained within a data stream, wherein a data deduplication system communicatively coupled to the plurality of servers is configured to split the data stream into the plurality of segments and select the grid server for deduplicating the segment of data;
        forwarding the segment of data to the selected grid server for deduplication; and
        deduplicating, using the plurality of grid servers, a zone contained within the forwarded segment of data using a listing of a plurality of zone stamps, each zone stamp in the listing of the plurality of zone stamps representing a zone in a plurality of zones previously deduplicated by at least one server in the plurality of grid servers, the deduplicating including
determining, using the listing of the plurality of zone stamps, by a first grid server in the plurality of grid servers that a second grid server in the plurality of grid servers previously deduplicated a first zone in the plurality of zones having a first zone stamp matching to a second zone stamp of a second zone being processed by the first grid server, and
transmitting, by the first grid server, the second zone to the second grid server for deduplication.

11. The system according to claim 10, wherein the listing of the plurality of zone stamps is a listing specific to the selected grid server.

12. The system according to claim 11, wherein the deduplicating further comprises
comparing, using at least one zone contained in the listing specific to the selected server, the zone contained within the forwarded segment of data to at least one zone stored on the selected server;
determining, using the selected grid server, whether the compared zone matches at least one zone stored on the selected server, wherein
upon determination that the compared zone matches at least one zone stored on the selected server, deduplicating the compared zone;
upon determination that the compared zone does not match at least one zone stored on the selected server, determining whether the compared zone matches at least one zone stored on another server in the plurality of grid servers using a listing of zone stamps specific to the another server.

13. The system according to claim 10, wherein the listing in the plurality of zone stamps is a listing of zone stamps for all servers in the plurality of grid servers.

14. The system according to claim 10, wherein the operations further comprise
segmenting the data stream into the plurality of segments of data;
determining a maximum zone size of a zone for deduplication by each grid server in the plurality of grid servers; and
determining a ratio of the maximum zone size to a size of each segment of data in the plurality of segment of data;
wherein the selecting of the grid server is based on the determined ratio.

15. The system according to claim 10, wherein the operations further comprise
selecting a plurality of grid servers for performing the deduplicating of the zone contained within the forwarded segment of data.

16. The system according to claim 10, wherein the operations further comprise
storing the deduplicated zone on the selected grid server.

17. The system according to claim 16, wherein the operations further comprise
forwarding, by the selected grid server, the deduplicated zone to another grid server in the plurality of grid servers upon determination by the selected grid server that storage of the deduplicated zone exceeds a storage capacity of the selected grid server.

18. The system according to claim 10, wherein the selecting, the forwarding and the deduplicating is performed in parallel for at least a portion of segments of data in the plurality of segments of data using at least a portion of grid servers in the plurality of grid servers.

19. A computer program product comprising a non-transitory machine-readable medium storing instructions that, when executed by at least one programmable processor, cause the at least one programmable processor to perform operations comprising:
selecting a grid server in a plurality of grid servers for deduplicating a segment of data in a plurality of segments of data contained within a data stream, wherein a data deduplication system communicatively coupled to the plurality of servers is configured to split the data stream into the plurality of segments and select the grid server for deduplicating the segment of data;
forwarding the segment of data to the selected grid server for deduplication; and
deduplicating, using the plurality of grid servers, a zone contained within the forwarded segment of data using a listing of a plurality of zone stamps, each zone stamp in the listing of the plurality of zone stamps representing a zone in a plurality of zones previously deduplicated by at least one server in the plurality of grid servers, the deduplicating including
determining, using the listing of the plurality of zone stamps, by a first grid server in the plurality of grid servers that a second grid server in the plurality of grid servers previously deduplicated a first zone in the plurality of zones having a first zone stamp matching to a second zone stamp of a second zone being processed by the first grid server, and
transmitting, by the first grid server, the second zone to the second grid server for deduplication.

20. The computer program product according to claim 19, wherein the listing of the plurality of zone stamps is a listing specific to the selected grid server.

21. The computer program product according to claim 20, wherein the deduplicating further comprises
comparing, using at least one zone contained in the listing specific to the selected server, the zone contained within the forwarded segment of data to at least one zone stored on the selected server;
determining, using the selected grid server, whether the compared zone matches at least one zone stored on the selected server, wherein
upon determination that the compared zone matches at least one zone stored on the selected server, deduplicating the compared zone;
upon determination that the compared zone does not match at least one zone stored on the selected server, determining whether the compared zone matches at least one zone stored on another server in the plurality of grid servers using a listing of zone stamps specific to the another server.

22. The computer program product according to claim 19, wherein the listing in the plurality of zone stamps is a listing of zone stamps for all servers in the plurality of grid servers.

23. The computer program product according to claim 19, wherein the operations further comprise
segmenting the data stream into the plurality of segments of data;
determining a maximum zone size of a zone for deduplication by each grid server in the plurality of grid servers; and
determining a ratio of the maximum zone size to a size of each segment of data in the plurality of segment of data;
wherein the selecting of the grid server is based on the determined ratio.

24. The computer program product according to claim 19, wherein the operations further comprise selecting a plurality of grid servers for performing the deduplicating of the zone contained within the forwarded segment of data.

25. The computer program product according to claim 19, wherein the operations further comprise storing the deduplicated zone on the selected grid server.

26. The computer program product according to claim 25, wherein the operations further comprise forwarding, by the selected grid server, the deduplicated zone to another grid server in the plurality of grid servers upon determination by the selected grid server that storage of the deduplicated zone exceeds a storage capacity of the selected grid server.

27. The computer program product according to claim 19, wherein the selecting, the forwarding and the deduplicating is performed in parallel for at least a portion of segments of data in the plurality of segments of data using at least a portion of grid servers in the plurality of grid servers.

* * * * *